United States Patent [19]

Hsiao

[11] Patent Number: 5,470,139
[45] Date of Patent: Nov. 28, 1995

[54] COMBINED DISPLAY CASE

[76] Inventor: Szu-Chang Hsiao, No. 8, Alley 2, Lane 106, Sec. 4, Pateh Rd., Taipei, Taiwan

[21] Appl. No.: 185,388
[22] Filed: Jan. 24, 1994
[51] Int. Cl.⁶ ............................... A47F 3/12; F16B 12/10
[52] U.S. Cl. ................... 312/140; 312/138.1; 312/265.1; 312/265.4; 312/111
[58] Field of Search .................................... 312/111, 140, 312/265.1, 265.2, 265.3, 265.4, 138.1; 292/149, 155, 301

[56] References Cited

U.S. PATENT DOCUMENTS

| | | | |
|---|---|---|---|
| 646,661 | 4/1900 | Hanstein | 312/265.4 |
| 724,996 | 4/1903 | Ferguson | 312/140 |
| 2,806,755 | 9/1957 | Glass | 312/265.4 |
| 2,956,705 | 10/1960 | Clingman | 312/140 |
| 3,428,349 | 2/1969 | Shelton | 292/155 |
| 4,470,647 | 9/1984 | Bishoff et al. | 312/140 |
| 5,003,741 | 4/1991 | Yeh | 312/140 |
| 5,046,791 | 9/1991 | Kooiman | 312/265.1 |

*Primary Examiner*—Kenneth J. Dorner
*Assistant Examiner*—Rodney B. White
*Attorney, Agent, or Firm*—Bacon & Thomas

[57] ABSTRACT

A combined display case is composed of a plurality of joints, frames and glass. Each joint has connecting posts or elliptic posts which can be inserted into through holes or elliptic holes of the frames so as to connect with each other. The joints and frames have receiving grooves in which glass can be installed firmly. In addition, the display case can be opened by installing hinges on the glass, and on the bottom of the glass, a door holder can be loosened to slide down into the receiving groove of a frame to latch the glass door. When the door holder is slid out of the receiving groove, the glass door can be opened freely.

6 Claims, 10 Drawing Sheets

COMBINED DISPLAY CASE

BACKGROUND OF THE INVENTION

This invention relates to a combined display case, especially a display case which is composed of a plurality of kinds of joints, frames and glass and can be extended freely so as to deposit and display articles or goods.

This conventional display case is made with permanent joints, such kind of display case can't be extended freely. Furthermore, it occupies too much space and causes an inconvenience in transportation.

SUMMARY OF THE INVENTION

It is therefore the main object of this invention to provide a combined display case which is composed of a plurality of kinds of joints, frames and glass and can be extended freely. Furthermore, the combined display case can be assembled according to the actual space and can be disassembled when carrying.

It is another object of this invention to provide a combined display case which can be opened by means of installing hinges on the glass. Furthermore, on the bottom of the glass is a door holder which can be loosened to slide down into a receiving groove of a frame so as to latch the glass door.

BRIEF DESCRIPTION OF THE DRAWINGS

In the drawings, which illustrate the preferred embodiments and modes of operation of the invention, and in which like reference characters designate the same or similar parts throughout the several views.

DETAILED DESCRIPTION OF THE PREFERRED EMBODIMENT

Figure 1A:
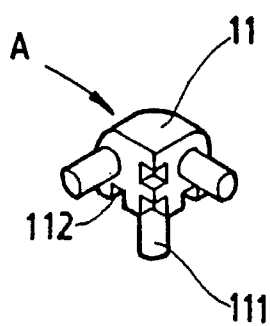
FIGS. 1A–1G are perspective views showing each kind of joints of this invention.
Figure 1B:
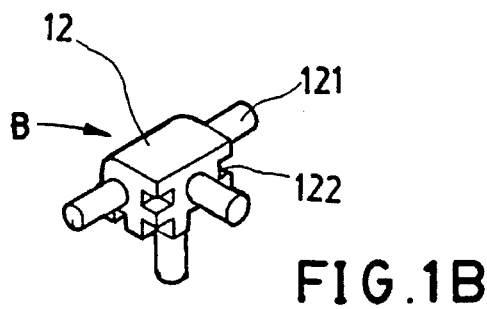
Figure 1C:
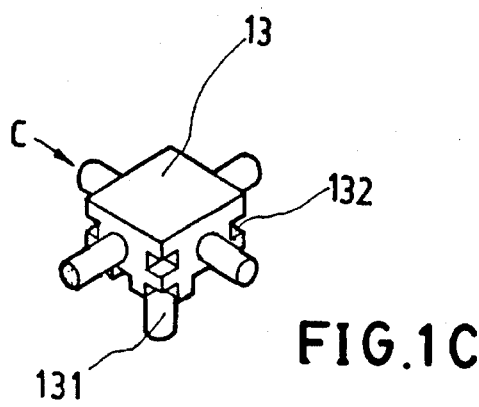
Figure 1D:
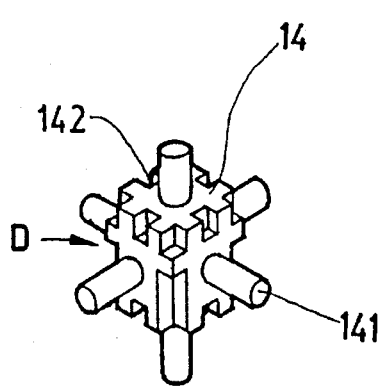
Figure 1E:
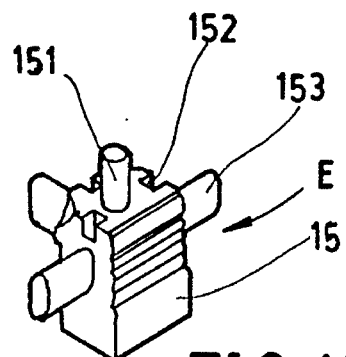
Figure 1F:
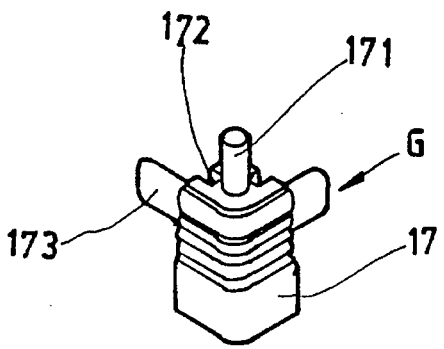
Figure 1G:
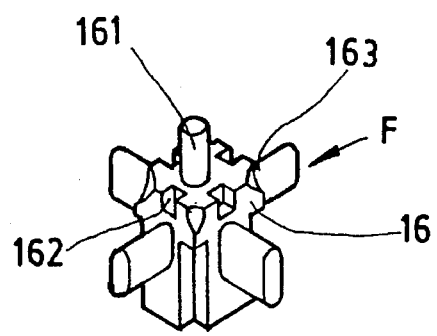
Figure 2A:
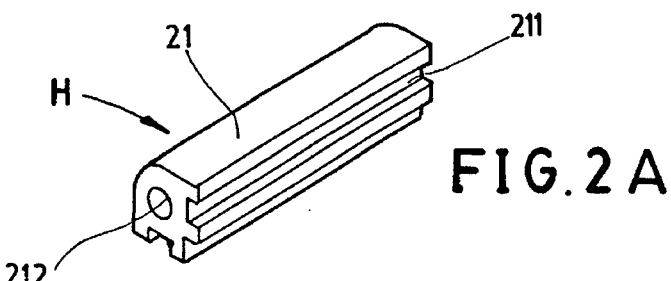
FIGS. 2A–2E are perspective views showing each kind of frames of this invention.
Figure 2B:
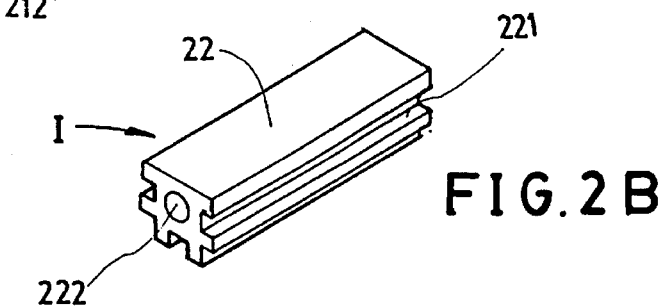
Figure 2C:
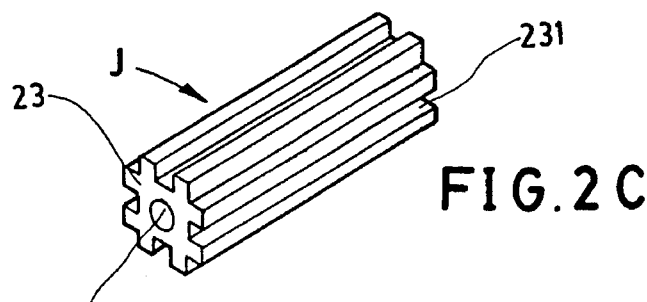
Figure 2D:
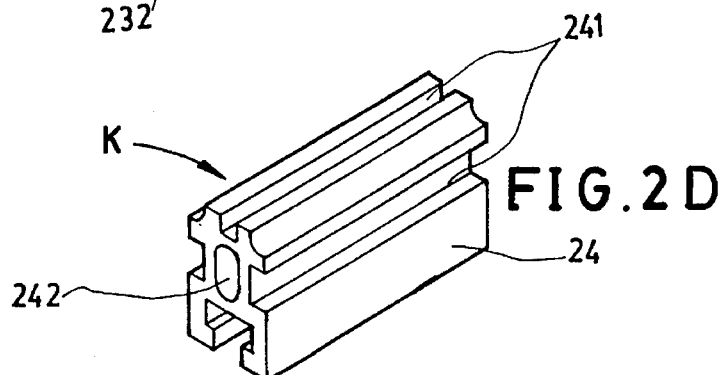
Figure 2E:
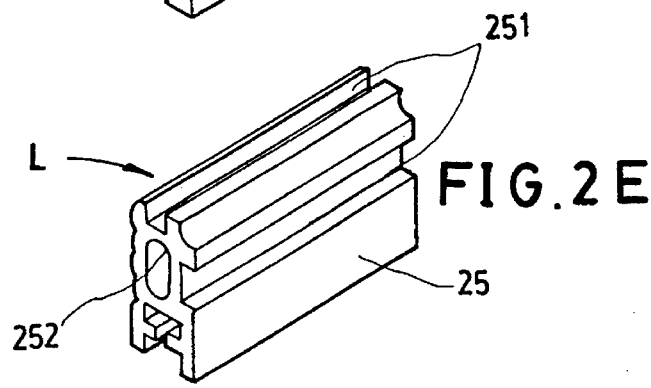
Figure 3A:
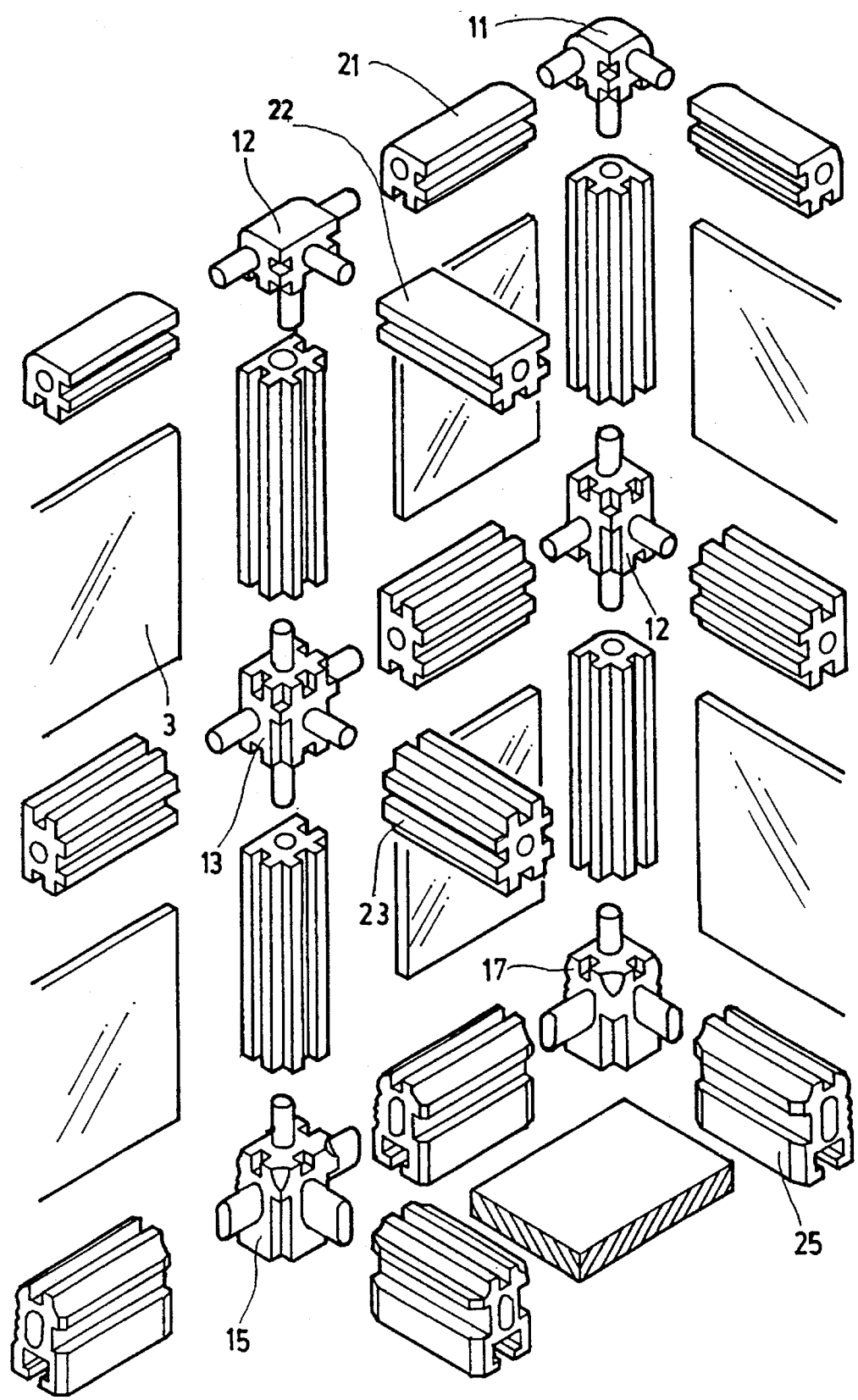
FIGS. 3A and 3B are exploded perspective views of this invention.
Figure 3B:
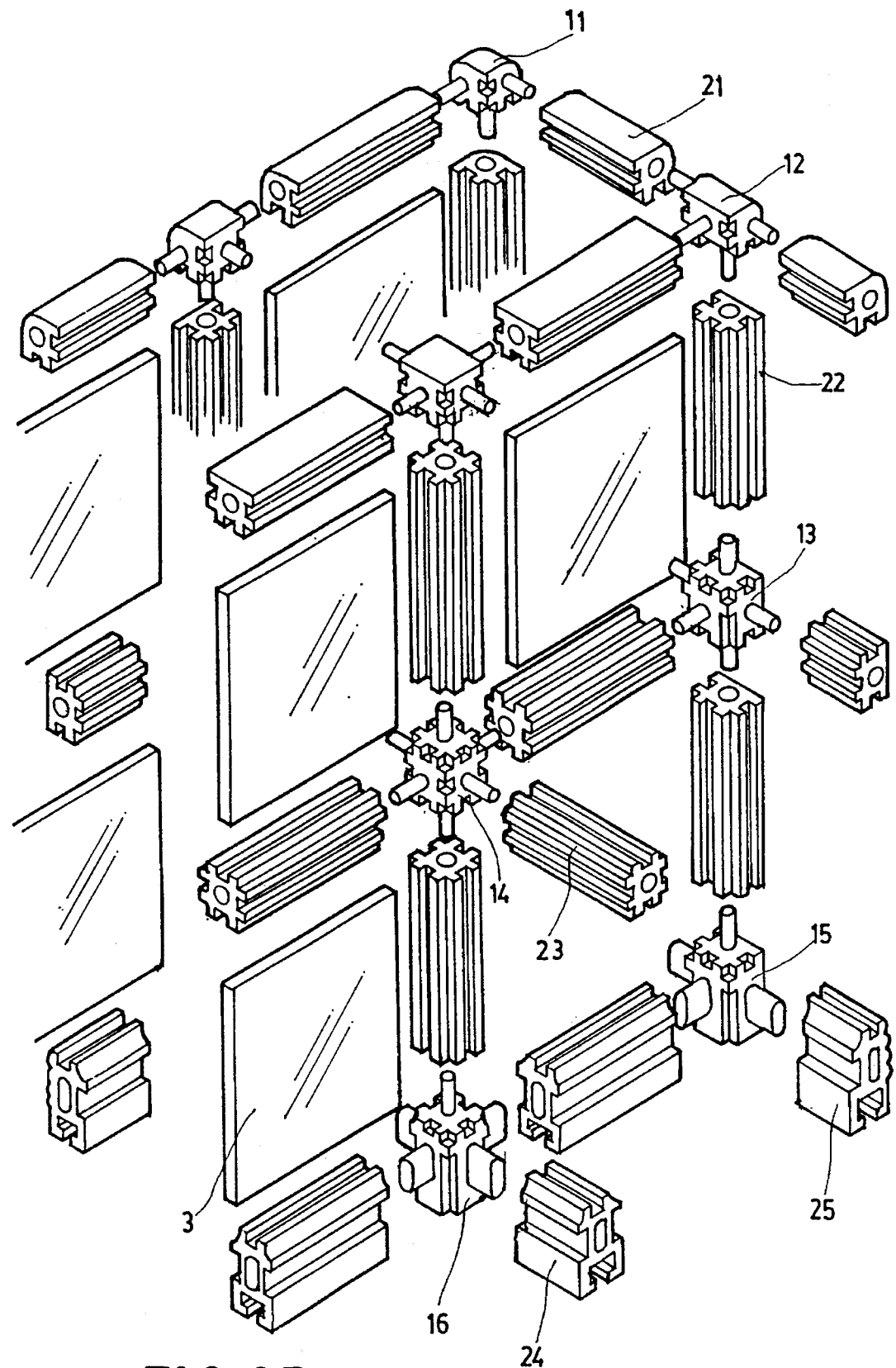

Referring to FIG. 1, FIG. 2 and FIG. 2, the combined display case is composed of a plurality of kinds of joints and frames. The joint C (13) has a connecting post (131) formed respectively at its X axis, -X axis, Y axis, -Y axis and -Z axis. Frame I (22) has a through hole (222), the through hole (222) on X, -X, Y, -Y axis of the joint C (13). The frame J (23) has a through hole (232) which can be fitted with the post (131) on -Z axis of the joint C (13). Furthermore, the joint C (13) has five grooves (132) which can be respectively fitted with receiving grooves (221) (231) of the frame I (22) and the frame J (23) so as to install the glass (3) firmly. The joint B (12) has a connecting post (121) formed respectively at its X axis, Y axis, -Y axis, -Z axis, and has three grooves (122). The frame H (21) has receiving grooves (211) and a through hole )21 2), the connecting posts (121) on Y axis and -Y axis of the joint B (12) being inserted into the through hole (212) of the frame H (21). The connecting post (121) on the X axis and -Z axis of the joint B (12) being inserted into the through hole (222) of the frame I (22). Four grooves (122) of the joint B (12) can be fitted with the receiving grooves (211) (221) of the frame H (21) and the frame I (22) so as to install the glass.

The joint A (11) has respectively a connecting post (111) formed at its X axis, Y axis, and -Z axis which can be inserted into the through hole (212) of the frame H (21). Furthermore, the joint A (11) has three grooves (112) which can be fitted with the receiving grooves (211) of the frame H (21).

The joint D (14) has a connecting post (141) formed respectively at its X axis, -X axis, Y axis, -Y axis, Z axis and -Z axis which can be inserted respectively into the through hole (232) of each frame J (23). Furthermore, the joint D (14) has eight grooves (142) which can be fitted with the receiving grooves (231) of each frame J (23) so as to install the glass.

The base of the combined display case is composed of the joint E (15), joint F (16), joint G (17), the frame K (24) and the frame L (25), wherein the joint E (15) has an elliptic post (153) formed respectively at its -X axis, Y axis, -Y axis and has a connecting post (151) formed at its Z axis, the joint E (15) also having three grooves (152). The frame L (25) has an elliptic hole (252) and two receiving grooves (251). The frame K (24) has an elliptic hole (242) and three receiving grooves (241).

The connecting post (151) of the joint E (15) can be inserted into the through hole (222) of frame I (22), the elliptic posts (153) of the Y axis and -Y axis of the joint E (15) can be inserted respectively into the elliptic hole (252) of the frame L (25). The elliptic post (153) on the X axis of the joint E (15) is inserted into the elliptic hole (242) of the frame K (24). Furthermore, the grooves (152) on joint E (15) can be fitted respectively with the receiving grooves (251) (241) of the frame L (25) and the frame K (24) so as to install the glass (3).

The joint F (16) has an elliptic post (163) formed respectively at its X axis, -X axis, Y axis and -Y axis and a connecting post (161) formed at its Z axis, the joint F (16) also having four grooves (162). The elliptic posts (163) of the joint F (16) are inserted respectively into the elliptic hole (242) of frame K (24), the connecting post (161) on Z axis of the joint F (16) is inserted into the through hole (232) of frame J (23).

The joint G (17) has an elliptic post (173) formed respectively at its X axis, -Y axis and a connecting post (172) formed at its Z axis, said joint G (17) also having there grooves (172). The elliptic posts (173) of the joint G (17) are inserted into the elliptic hole (252) of the frame L (25) and the connecting post (171) is inserted into the through hole (212) of the frame H (21).

The frame K (24) and the frame L (25) both have T-shape bottoms which can prevent the combined display case from damping.

Figure 4:
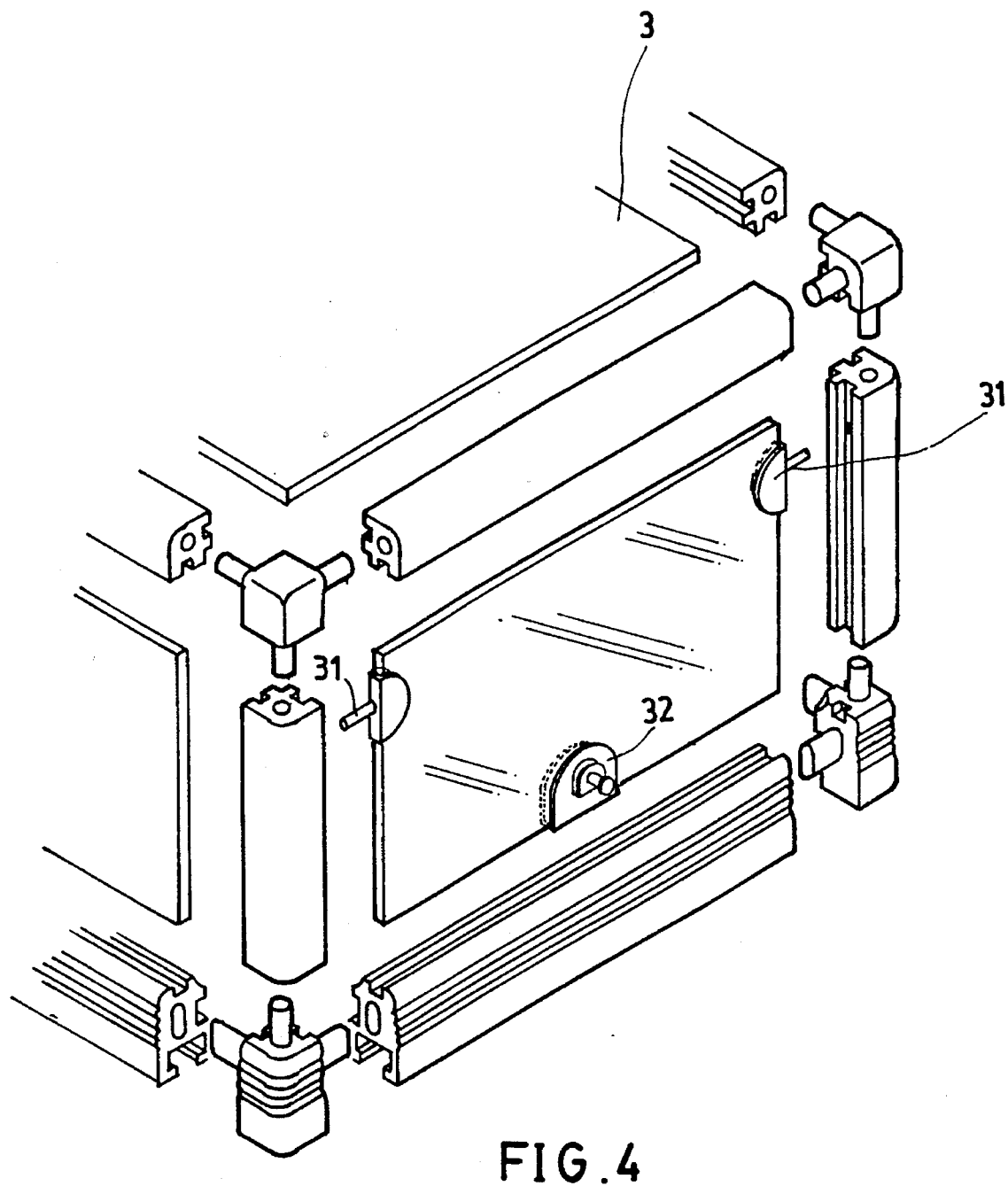
FIG. 4 is a partial, exploded perspective view showing the hinge and the latch of the invention.
Figure 5:
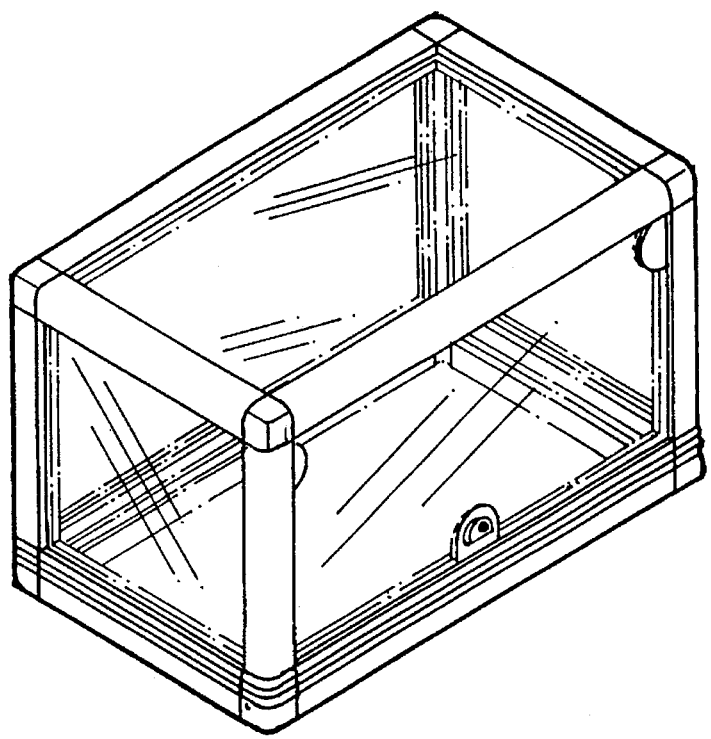
FIG. 5 and FIG. 6 are perspective views of this invention.
Figure 6:
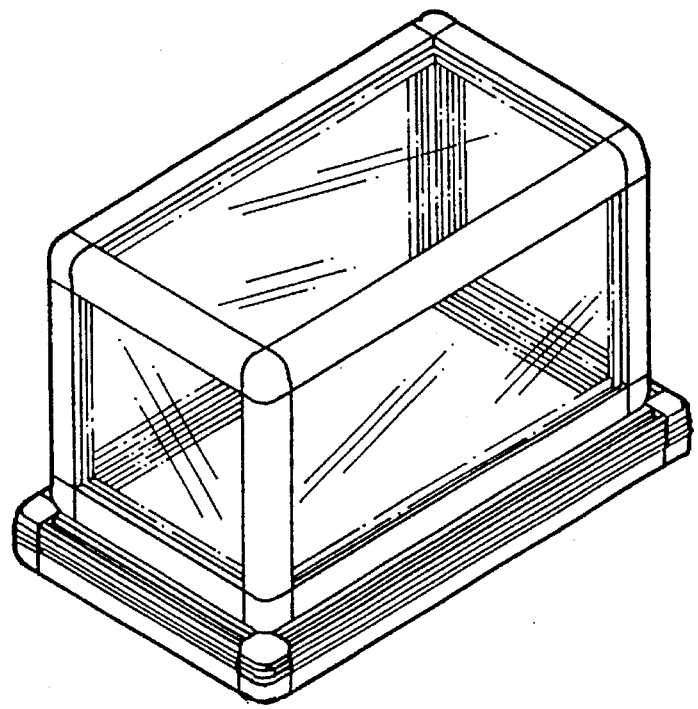
Figure 7:
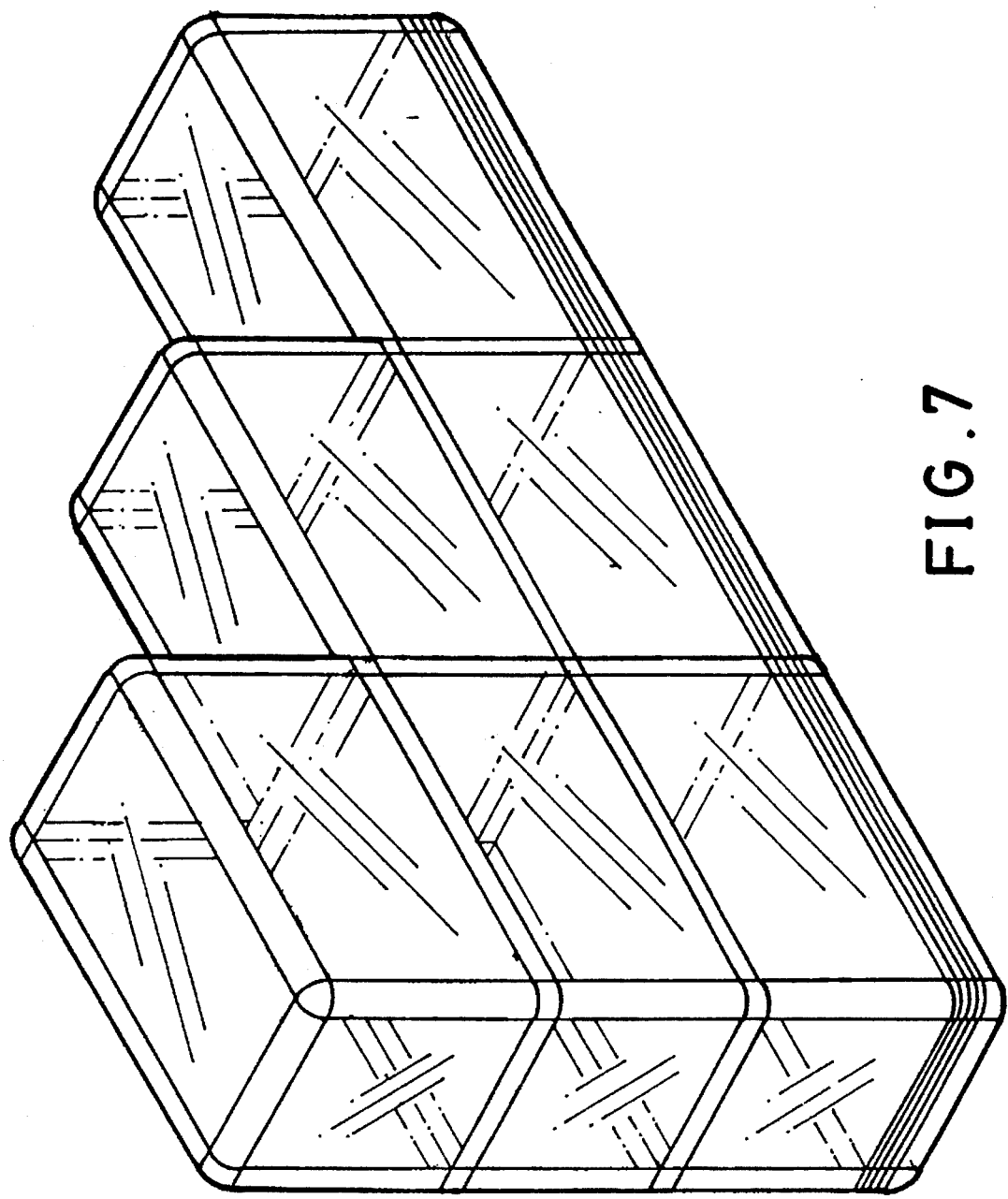
FIG. 7 is a perspective view showing another form of display case of this invention.
Figure 8:
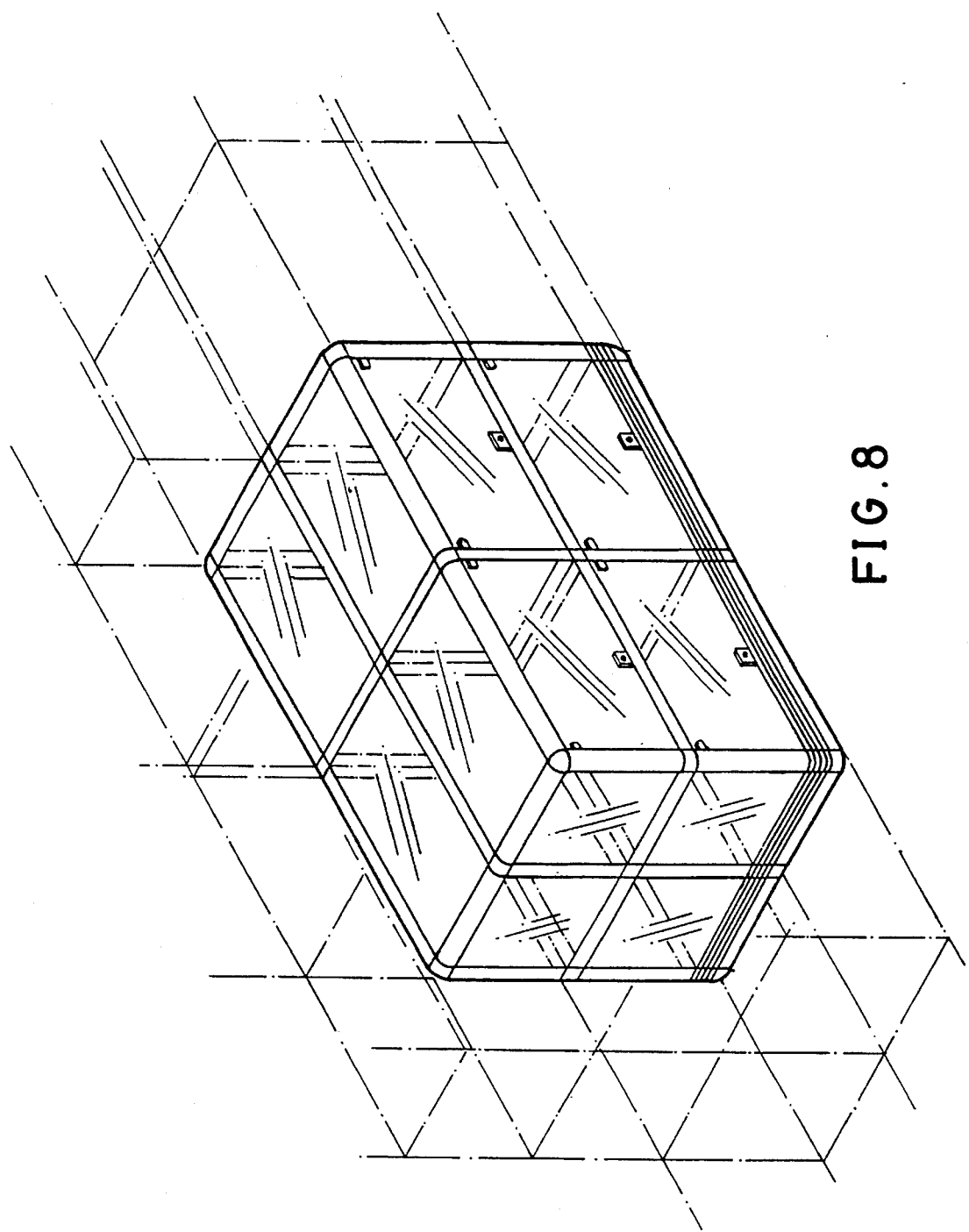
FIG. 8 is a perspective view of a preferred embodiment of this invention.
Figure 9A:
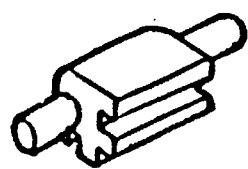
FIGS. 9A–9C are perspective views of another embodiment of this invention.
Figure 9B:
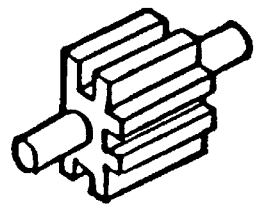
Figure 9C:
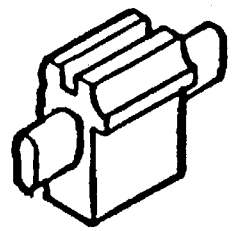
Figure 10:
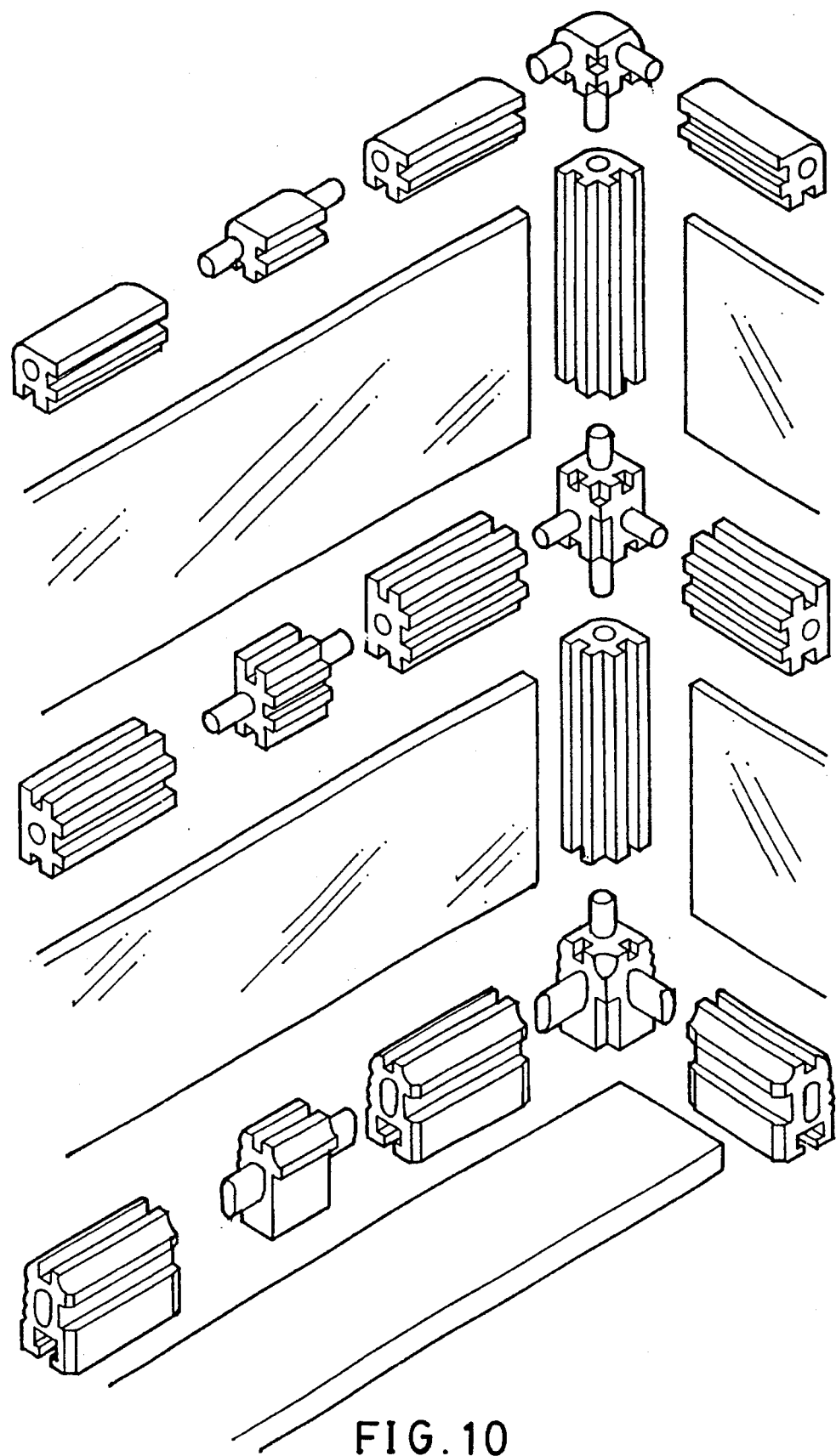
FIG. 10 is a partial, exploded perspective view of still another embodiment of this invention.

Referring to FIG. 4 and FIG. 5, the glass (3) installed between the frame H (21) and the frame L (25) is assembled with a hinge (31) (31') respectively at its side. The bottom of the glass (3) has a door holder (32). When loosening the screw of the door holder (32), the door holder (32) can be slid down into the receiving groove (251) of frame L (25) so as to latch the glass (3), the door holder (32) being retained on the glass (3) by tightening the screw the glass (3) can be opened by means of a the hinges (31) (31'). FIG. 6, FIG. 7 and FIG. 8 show other embodiments of this invention. Furthermore, FIG. 9 shows other kinds of joints and frames. FIG. 10 illustrates the combined display case formed by the joints and frames in FIG. 9.

What is claimed is:

1. A display case assembly having at least one display case with a substantially parallelepiped configuration and comprising:

a) at least one base wall, at least figure side walls, and at least one top wall;

b) at least our base frame members, each base frame member having a first receiving groove extending along the length of the base frame member configured to receive an edge of the base wall and a second receiving groove extending along the length of the base frame member configured to receive an edge of a side wall, the base frame members having a first cross-sectional configuration;

c) at least four base corner members, each removably attached to two base frame members so as to form a base having a substantially parallelepiped configuration;

d) an upstanding frame member removably attached to and extending upwardly from each of the at least four base corner members, the upstanding frame members having a second crosssectional configuration different from the first cross-sectional configuration, at least two third receiving grooves extending along the length and configured to receive edges of two side walls;

e) at least four top frame members, each having at least two fourth receiving grooves extending along the length configured to receive edges of the side walls and top wall, the top frame member having a third cross-sectional configuration different from the first cross-sectional configuration;

f) at least four corner members, each removably attached to an upstanding frame member and two top frame members; and, g) pivot attaching means for pivotally attaching at least one side wall to adjoining upstanding frame members comprising hinge pins extending from the side wall so as to engage holes formed in-the adjoining upstanding frame members such that the pivot axis extends generally perpendicular to the third receiving grooves in the adjoining side members to which the hinge pins are attached.

2. The display case assembly of claim 1 further comprising a door holder attached to the pivoting side wall to hold the pivoting side wall in a closed position.

3. . The display case assembly of claim 1 wherein the side walls and top wall each have at least one corner and further comprising a plurality of corner grooves formed in each corner member to receive corners of the walls.

4. The display case assembly of claim 1 further comprising:

a) a through hole formed in each upstanding and top frame member having a circular cross-sectional configuration; and, b) a plurality of connecting posts extending from each corner member configured so as to engage the through holes.

5. The display case assembly of claim 4 further comprising:

a) a second through hole formed in each base frame member having a non-circular cross-sectional configuration; and, b) a plurality of second connecting posts extending from each base corner member, each post having a non-circular cross-sectional configuration so as to engage the second through holes.

6. The display case assembly of claim 1 wherein each base frame member has a bottom and further comprising an elongated opening extending along the bottom, the opening having a "T"-shaped cross-sectional configuration with the base leg of the "T" opening towards the bottom of the base frame member.

* * * * *